United States Patent
Kiest, Jr.

(10) Patent No.: US 9,677,882 B2
(45) Date of Patent: Jun. 13, 2017

(54) METHOD AND MEANS FOR DETERMINING PIPE DIAMETER

(71) Applicant: LMK Technologies, LLC, Ottawa, IL (US)

(72) Inventor: Larry W. Kiest, Jr., Ottawa, IL (US)

(73) Assignee: LMK TECHNOLOGIES, LLC, Ottawa, IL (US)

( * ) Notice: Subject to any disclaimer, the term of this patent is extended or adjusted under 35 U.S.C. 154(b) by 0 days.

(21) Appl. No.: 13/628,443

(22) Filed: Sep. 27, 2012

(65) Prior Publication Data

US 2014/0085643 A1    Mar. 27, 2014

(51) Int. Cl.
    *G01B 11/02*    (2006.01)
    *G01B 21/14*    (2006.01)

(52) U.S. Cl.
    CPC .................... *G01B 21/14* (2013.01)

(58) Field of Classification Search
    CPC ....... F16L 55/18; F16L 55/16; F16L 55/1645; E21B 44/00; H04N 7/18; G01B 11/02
    USPC ...... 356/635; 405/184.2; 138/98; 137/15.08; 175/24
    See application file for complete search history.

(56) References Cited

U.S. PATENT DOCUMENTS

| | | | |
|---|---|---|---|
| 6,378,627 B1* | 4/2002 | Tubel et al. | 175/24 |
| 2003/0215291 A1* | 11/2003 | Warren | 405/184.2 |
| 2008/0047624 A1* | 2/2008 | Iwasaki-Higbee | 138/98 |
| 2011/0297243 A1* | 12/2011 | Kiest, Jr. | 137/15.08 |
| 2012/0257042 A1* | 10/2012 | McKaigue et al. | 348/84 |

FOREIGN PATENT DOCUMENTS

JP          11156272 A   *   6/1999

OTHER PUBLICATIONS

El Kahi, S.; Asmar, D.; Fakih, A.; Nieto, J.; Nebot, E., "A vison-based system for mapping the inside of a pipe," Robotics and Biomimetics (ROBIO), 2011 IEEE International Conference on , vol., no., pp. 2605,2611, Dec. 7-11, 2011.*

* cited by examiner

*Primary Examiner* — Tarifur Chowdhury
*Assistant Examiner* — Jamil Ahmed
(74) *Attorney, Agent, or Firm* — Nyemaster Goode, P.C.

(57) ABSTRACT

An apparatus and method for determining the diameter of a pipe from a remote location is disclosed. A measuring assembly, including a reference device and an imaging device, is inserted into a pipe from a remote location. The reference device is inflatable to a predetermined and known diameter within the pipe. The imaging device acquires imaging data of the reference device within the pipe and the imaging data is used to determine the diameter of the pipe by comparing the predetermined diameter of the reference device with the diameter of the wall of the pipe. The diameter of the pipe is then used to properly choose a liner assembly of the same diameter to repair the wall of the pipe. The liner tube may include a bladder and liner tube, which is saturated with a curable resin, to repair the wall of the pipe.

50 Claims, 7 Drawing Sheets

METHOD AND MEANS FOR DETERMINING PIPE DIAMETER

FIELD OF THE INVENTION

The present invention relates generally to sewer line repair. More particularly, but not exclusively, the invention relates to an improved method and means for determining the diameter of a sewer pipe from a remote location prior to repairing the pipe.

BACKGROUND OF THE INVENTION

Cured-in-place pipe repair (CIPP) has been used to repair damaged main sewer pipes or lateral sewer pipes as well as other types of conduits. Generally, a liner tube is impregnated with a resinous material, and is positioned in a pipe adjacent a damaged area of pipe. The liner tube is pressed against the wall of the damaged area of the pipe and the resin is allowed to cure in the bladder, thus leaving a renewed pipe wall. In addition, the liner tube is either pulled in place or inflated and inverted into the pipe to the damaged area in need of repair.

Liner tubes are generally formed from a flat piece of material, which is sized to be the correct length and width to fully cover the lateral pipe wall. The material is then rolled together, with the two ends of the width of the liner connected by stitching or welding, to form the tube. The diameter of the liner tube must be the same as the diameter of the lateral pipe. The same diameters are required so that there is a perfect fit of the liner tube in the lateral pipe. If the liner tube has a diameter less than the diameter of the lateral pipe, ripping or tearing of the liner could occur. If, on the other hand, the liner tube has a diameter greater than the diameter of the lateral pipe, the liner tube may fold over itself, or create bulges in the cured liner. These folds or bulges could cause blockages in the lateral pipe, and need to be cut or sanded out. The extra work is time consuming and expensive.

Methods of measuring lateral pipes do exist. For example, one method of measuring the diameter of a pipe involves inserting a rod directly into a lateral pipe to determine the diameter of the pipe. However, this method required direct access to the lateral pipe. The direct access may come from digging a large portion of the ground adjacent the lateral pipe and directly inserting the measuring device. However, digging to obtain direct access to a lateral pipe is time consuming and expensive. In addition, because a large excavation area must be dug to obtain direct access to the lateral pipe, the land around the pipe will remain unattractive until the landscaping of the site can be repaired. In other instances, such as where obstacles around the pipe exist, digging may not be possible to directly access the lateral pipe.

Accordingly, there is a need in the art for an improved method and means of determining the diameter of a lateral pipe without having to directly access the lateral pipe. There is also a need in the art for a method and means of determining the diameter of a lateral pipe to properly repair the wall of the pipe.

SUMMARY OF THE INVENTION

It is therefore a primary object, feature, and/or advantage of the present invention to provide an improved method and means of determining the diameter of a lateral pipe that improves or solves deficiencies in the art.

It is another object, feature, and/or advantage of the present invention to provide an improved method and means of determining the diameter of a lateral pipe when there is no direct access to the pipe.

It is another object, feature, and/or advantage of the present invention to provide an improved method and means of determining the diameter of a lateral pipe to repair defects in the lateral pipe by cured-in-place pipe lining.

It is another object, feature, and/or advantage of the present invention to provide a method and apparatus for determining the diameter of a lateral pipe via access through a cleanout pipe.

It is another object, feature, and/or advantage of the present invention to provide a reference device that can determine at least three different diameters of lateral pipes.

It is another object, feature, and/or advantage of the present invention to provide an improved method and means for determining the diameter of a lateral pipe that can be done from a remote location.

It is another object, feature, and/or advantage of the present invention to provide an improved method and means of determining the diameter of a lateral pipe using a reference device having a predetermined diameter.

It is another object, feature, and/or advantage of the present invention to provide an improved method and means of determining the diameter of a lateral pipe using and imaging device to view within the pipe.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, a method of determining the diameter of a lateral pipe of a sewer pipe system from a remote location outside of the sewer to assist in repairing the wall of the pipe is provided. The method comprises providing a measuring assembly comprising an imaging device and a reference device operatively connected to the imaging device and positioned at least partially forward of the imaging device. The measuring assembly is inserted into the lateral pipe, and then moved through the lateral pipe. As the measuring assembly moves through the lateral pipe, imaging data of the reference device and the lateral pipe is acquired from the imaging device. The imaging data is used to determine the diameter of the lateral pipe.

According to another aspect of the present invention, a measuring assembly for determining the diameter of a pipe from a remote location to assist in the repair of the pipe is provided. The measuring assembly includes an imaging device and a reference device. The imaging device is for acquiring imaging data inside the pipe. The reference device is operatively connected to the imaging device and positioned at least partially forward of the imaging device, and is adapted to be of a known and predetermined diameter to compare to the diameter of the pipe to determine the pipe diameter.

According to another aspect of the present invention, a method of determining the diameter of a lateral pipe of a sewer pipe system from a remote location outside of the sewer to assist in repairing a wall of the pipe is provided. The method includes providing a measuring assembly including an imaging device, an imaging cable operatively connected to the imaging device, an inflatable plug operatively connected to the imaging device and positioned at least partially forward of the imaging device, and an air hose. The measuring assembly is inserted into the lateral pipe. The plug is inflated to a predetermined diameter within the lateral pipe. The measuring assembly is moved through the lateral pipe. Imaging data is acquired from the imaging device, including the predetermined diameter of the inflatable plug relative to the diameter of the lateral pipe as the measuring assembly moves through the length of the lateral pipe. The imaging data is used to determine the diameter of the lateral pipe along the length of the lateral pipe.

According to another aspect of the present invention, a measuring assembly for determining the diameter of a lateral pipe of a sewer pipe system from a remote location outside of the sewer to aid in repairing the lateral pipe is provided. The assembly includes an imaging device, an imaging cable, an inflatable plug, and an air hose. The imaging device is used to collect imaging data in a lateral pipe. The imaging cable is operatively connected to the imaging device and configured to transmit the imaging data to the remote location. The inflatable plug is operatively connected to the imaging device and positioned at least partially forward of the imaging device, the plug having a predetermined diameter when fully inflated. The air hose is operatively connected to the plug and configured to inflate the plug after the assembly is inserted into the lateral pipe. The imaging data is used to compare the predetermined diameter of the inflated plug with the lateral pipe to determine the diameter of the lateral pipe.

According to yet another aspect of the present invention, a method of repairing at least a portion of a lateral pipe of a sewer system is provided. The method includes determining the diameter of the lateral pipe along the length of the pipe by providing a measuring device comprising an imaging device and a reference plug having a predetermined diameter and being at least partially forward the imaging device, and acquiring imaging data of a difference between the diameter of the plug and the diameter of the lateral pipe. A liner assembly, including a bladder tube and a liner tube impregnated with a resinous material capable of curing and hardening, based on the measured diameter of the lateral pipe, is chosen. The liner assembly is inserted into the lateral pipe, and the liner tube is pressed against a wall of the pipe. The resinous material is allowed to cure, and then the bladder tube is removed from the lateral pipe to leave the liner tube cured in place in the lateral tube along the length of the pipe.

DETAILED DESCRIPTION OF THE PREFERRED EMBODIMENTS

Figure 1:
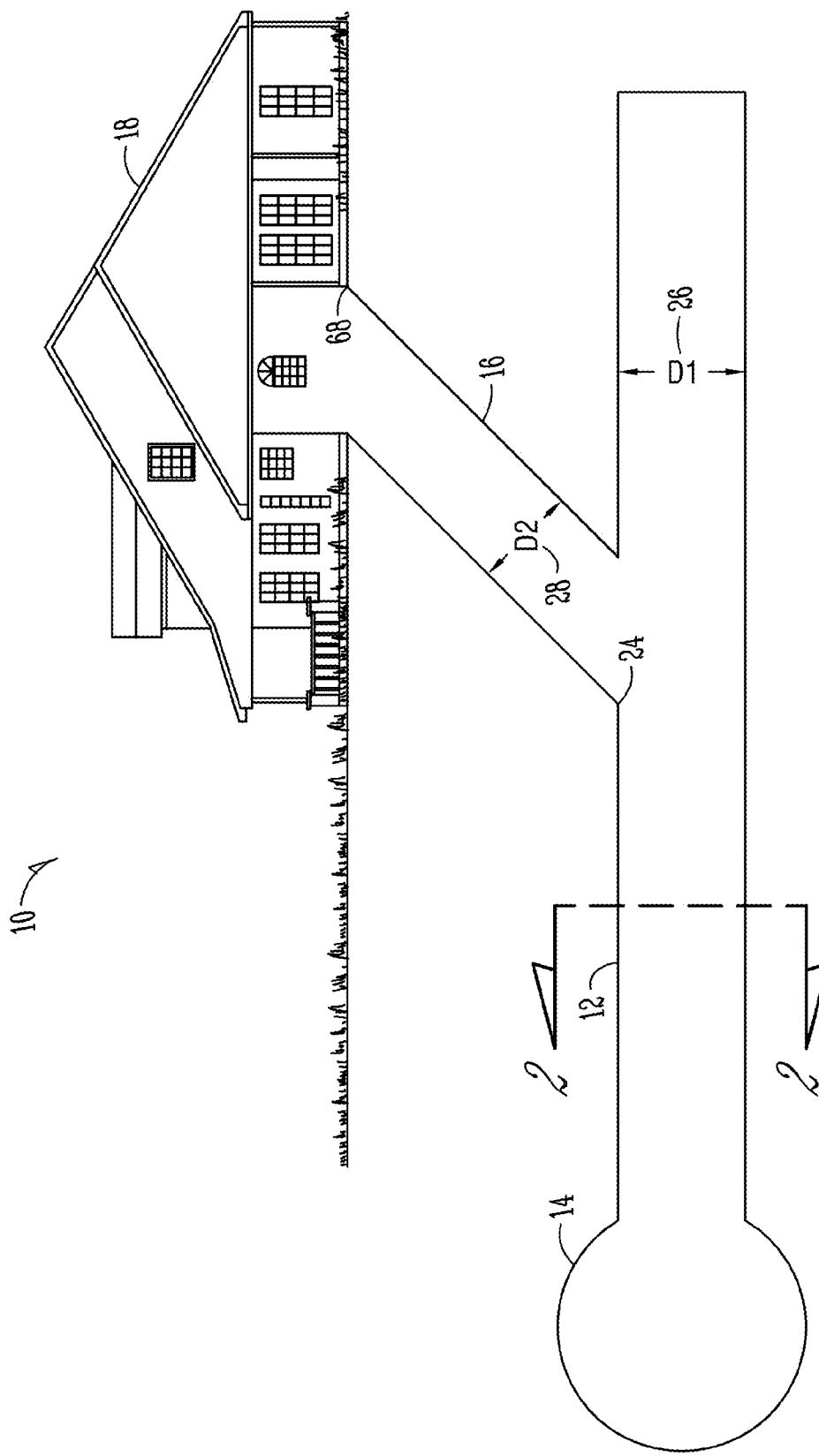
FIG. 1 is a sectional view of an exemplary embodiment of a sewer pipe system showing a house, cleanout pipe, lateral pipe, and main pipe.

FIG. 1 is a sectional view of an exemplary embodiment of a sewer pipe system 10 showing a house 18, a cleanout pipe 16, a lateral pipe 12, and a main pipe 14. As shown in FIG. 1, the cleanout pipe 16 generally extends from the house 18 and connects with a lateral pipe 12. The cleanout pipe 16 has an opening 68 at the house 18 and ends terminate at an opening 24 of the lateral pipe 12. The cleanout pipe 16 also has a diameter 28, generally shown as D2 in FIG. 1. The lateral pipe 12 is connected in FIG. 1 at the junction between the lateral pipe 12 and cleanout pipe 16 at a wye configuration. Although it is shown in FIG. 1 as a wye shape, it can also be a tee shape, where the lateral pipe 12 and the cleanout pipe 16 are generally perpendicular to one another. The lateral pipe 12 is generally circular shaped and includes a diameter 26, which is shown as D1 in FIG. 1. In this instance, the diameter 26 of the lateral pipe 12 is generally constant along the length of said lateral pipe 12. However, the lateral pipe may also vary in diameter size along its length. The lateral pipe 12 ends at a juncture with the main pipe 14. In this instance, the main pipe 14 is shown to be perpendicular to the lateral pipe 12, however, the main pipe 14 may also intersect with the lateral pipe 12 in a wye-shaped orientation. Therefore, it should be noted that all juncture shapes are within the scope of the present invention.

Figure 2:
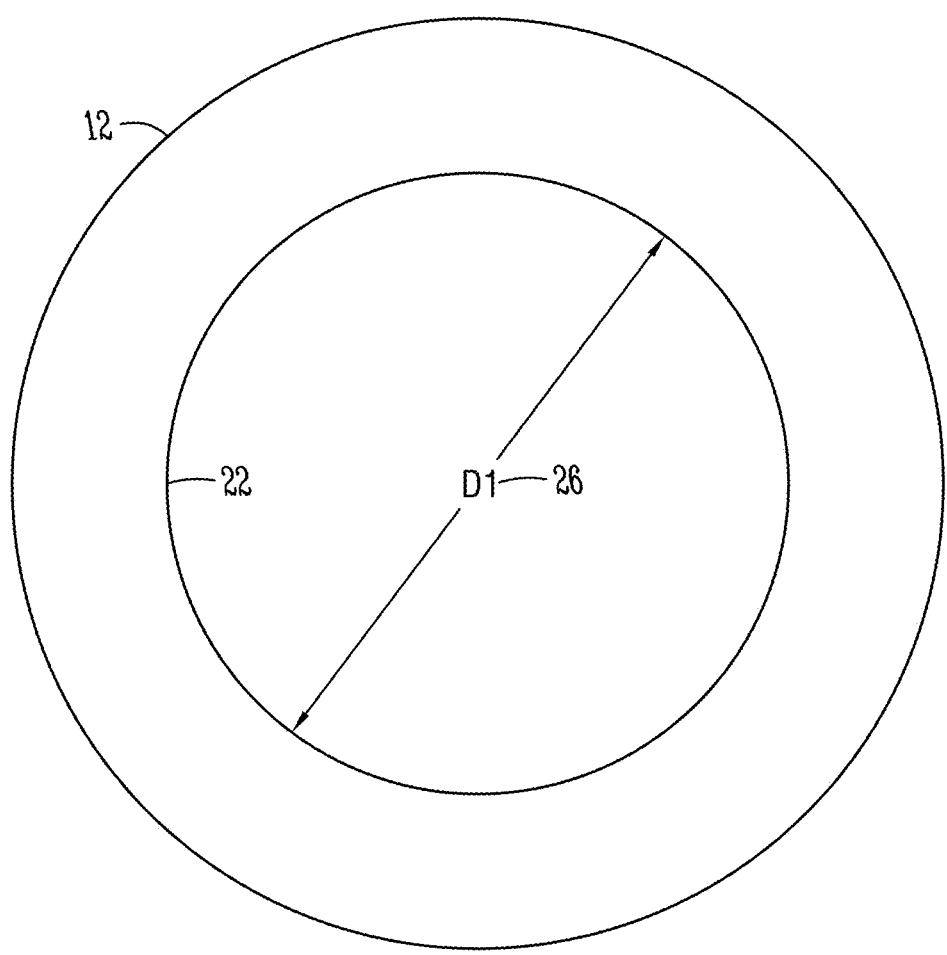
FIG. 2 is a cross-sectional view of the lateral pipe of FIG. 1 along the line 2-2.

FIG. 2 is a cross-sectional view of the lateral pipe 12 of FIG. 1 taken along the line 2-2 of FIG. 1. FIG. 2 shows the diameter 26, shown as D1, as being the inner diameter of the wall 22 of the lateral pipe 12. Also shown in FIG. 2, the lateral pipe wall 22 has a thickness, however, the thickness of the lateral wall 22 does not affect the present invention.

Figure 3:
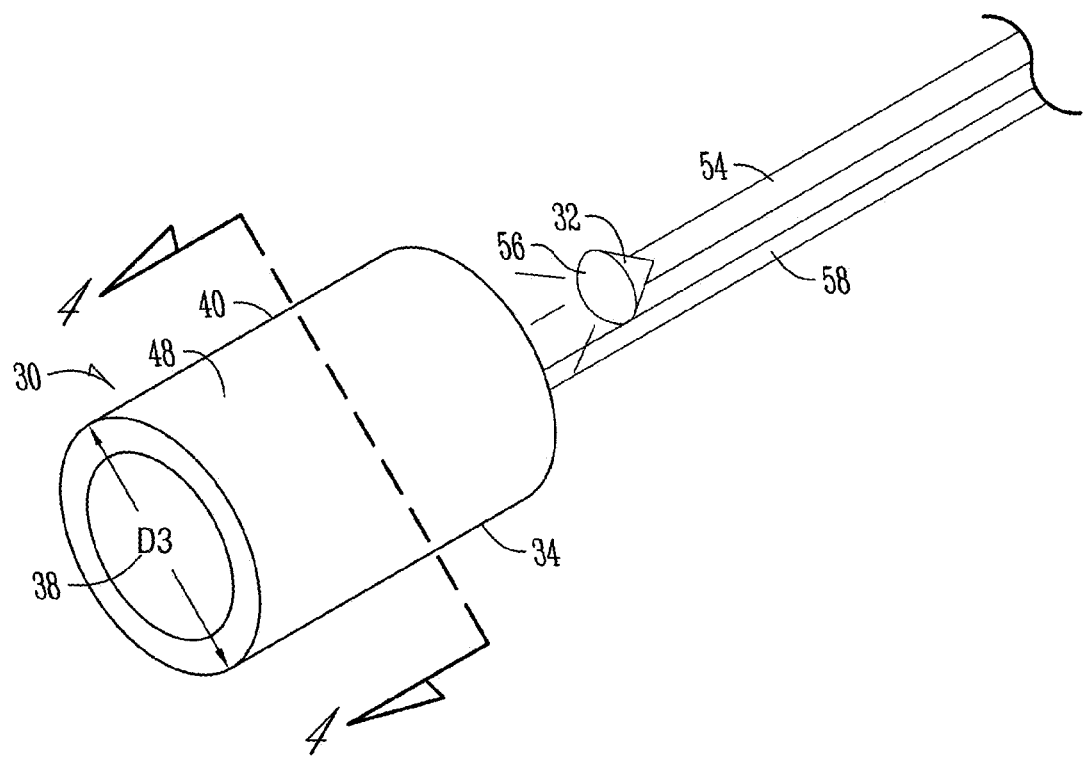
FIG. 3 is a perspective view of a measuring assembly of the present invention with the reference device having a predetermined diameter.

FIG. 3 is a perspective view of the measuring assembly 30 of the present invention with the reference device 34 having a predetermined diameter 38. The measuring device 30 of the present invention includes an imaging device 32, a reference device 34, an imaging cable 54, and an hose 58. The reference device 34 may be an inflatable plug, which has a reinforcing scrim surrounding the plug to limit the inflation of the plug to a predetermined diameter 38, which will be known. In FIG. 3, the reference device 34 is an inflated plug 40 having an outer wall 48 inflated to the predetermined diameter 38. The imaging device 32 may be a camera connected to a photo cable 54 that is able to acquire imaging data within a pipe. The camera shown in FIG. 3 includes a lens 56 for acquiring the imaging data. While the imaging device 32 of FIG. 3 is shown to be a camera, it should be appreciated that other types of imaging acquiring devices may be utilized for the present invention, such as sensors or the like. The reference device is operably connected to the imaging device 32 and is positioned at least partially forward of the imaging device 32. Having the reference device forward of the imaging device 32 allows the imaging device 32 to acquire imaging data of the reference device 34 while in the cleanout pipe 16 or lateral pipe 12. The reference device 34 is further connected to an hose 58, which may be an air hose to expand and deflate the reference device 34 or inflatable plug within the pipe. It should be noted that the measuring assembly 30, comprising the reference device 34 and the imaging device 32, is constructed to move as a single unit through the cleanout pipe 16 and lateral pipe 12, respectively. Therefore, the reference device and the imaging device may be connected to move as one unit through the pipe.

Figure 4:
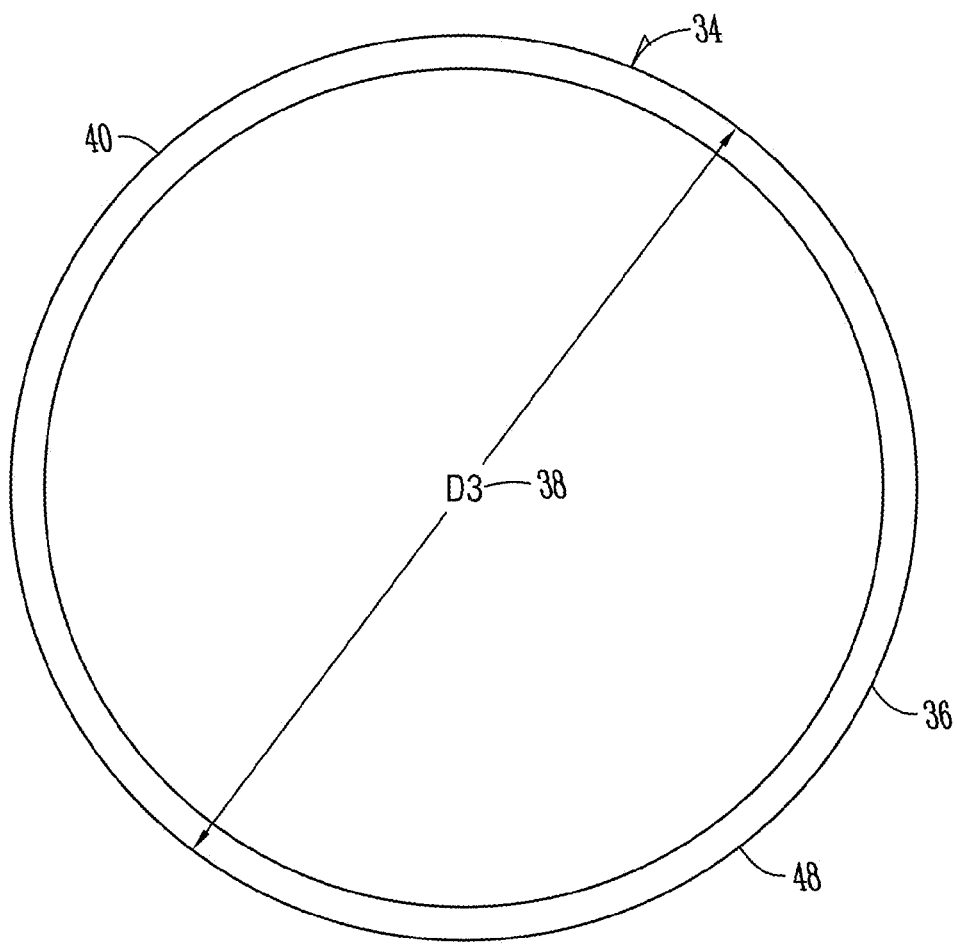
FIG. 4 is a cross-sectional view of an embodiment of the reference device used in the measuring assembly of FIG. 3 according to line 4-4.

FIG. 4 is a cross-sectional view of an embodiment of the reference device 34 used in the measuring assembly 30 of FIG. 3, according to line 4-4 of FIG. 3. The reference device 34 is an inflated plug 40 which has been inflated to a predetermined diameter 38, generally shown as D3 in FIG. 4. It should be noted that the diameter 38 is the outer diameter of the outer wall 48, or reinforcing scrim, of the reference device 34. This predetermined diameter 38 is fixed and known. The diameter 38 can be predetermined by the inclusion of a reinforcing scrim 36 placed around the outer wall 48 of the reference device 34. The reinforcing scrim 36 limits the amount of inflation of the reference device 34 to the predetermined diameter 38. While FIG. 4 shows the outer wall 48 and scrim 36 to have a thickness, it should be appreciated that reinforcing scrim 36 will generally be a negligible thickness and will not affect the predetermined diameter 38 of the reference device 34.

Figure 5:
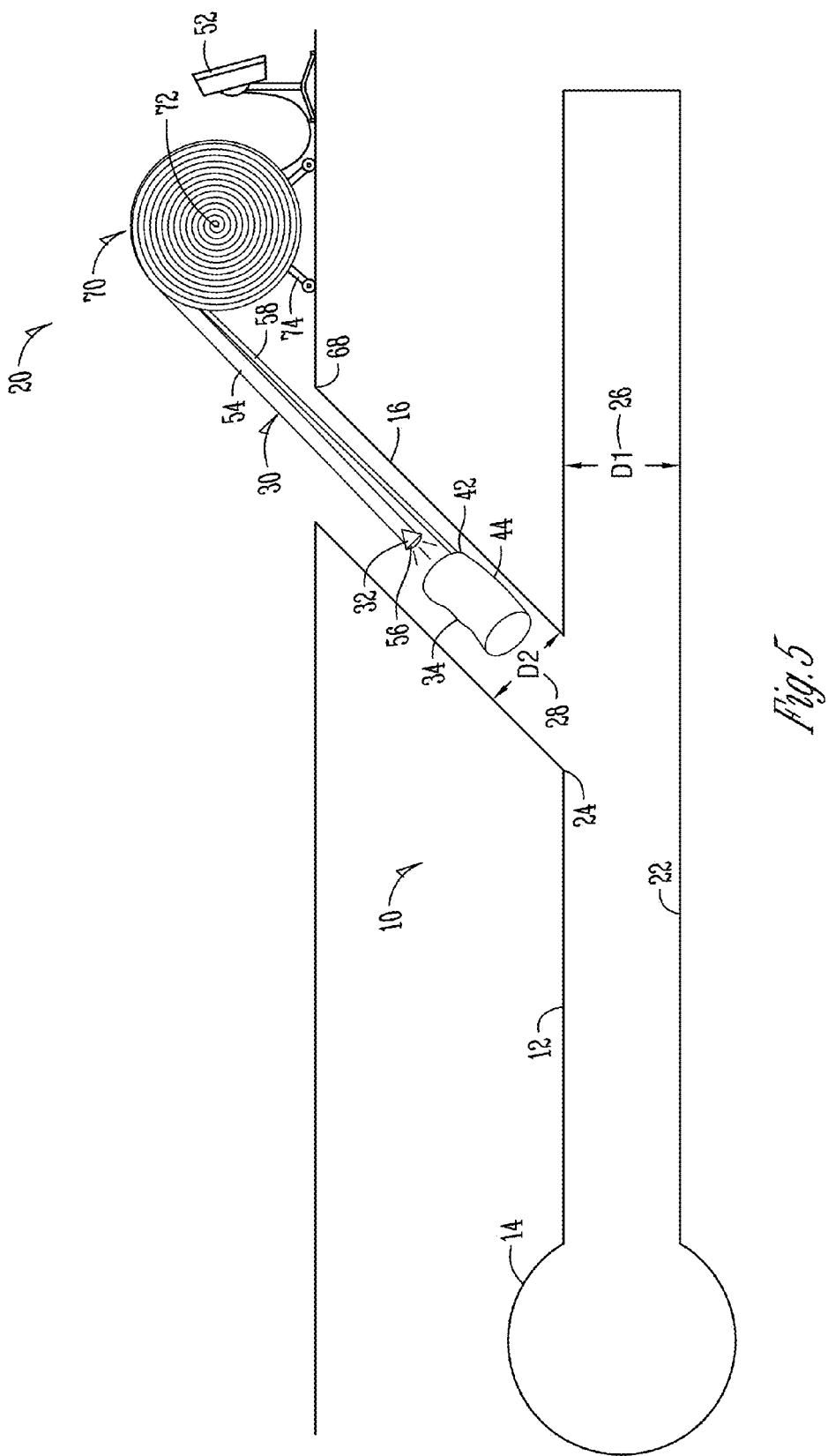
FIG. 5 is a sectional view of the measuring assembly in an insert position being inserted through a cleanout pipe.

FIG. 5 is a sectional view of the measuring assembly 30 in an insert configuration 44 being inserted through a cleanout pipe 16. The measuring assembly 30 may be connected to a reel 70, which holds the imaging cable 54 and the hose 58. In this embodiment, the hose is an air hose. The reel 70 is located at a remote location 20 outside of the pipe system 10 and includes a center roller 72 and a plurality of supports 74. In addition, an imaging viewer 52 may be operably connected to the reel 70. The reel 70 moves the measuring assembly 30 through the cleanout pipe 16, with the reference device 34 being deflated. The deflated plug 42 has a diameter less than the predetermined diameter 38 so as to move through pipes having diameter less than the predetermined diameter. As shown in FIG. 5, the reference device 34 is generally positioned forward of the imaging device 32 as the measuring assembly 30 is inserted through the opening 68 of the cleanout pipe 16 and moved towards the lateral pipe 12. It should also be noted that an operator views imaging data acquired by the imaging device 32 at the imaging viewer 52 at the remote location 20. The imaging viewer 52 may be a monitor or other type of screen capable of displaying the imaging data acquired by the imaging device 32. For instance, when the imaging device 32 is a camera taking video of the inside of the pipe, the imaging viewer 52 will display the video of the imaging data. It should also be appreciated that the reel 70 includes air or another fluid supply for inflating the reference device 34 once in position within the pipe to have the diameter determined.

Figure 6:
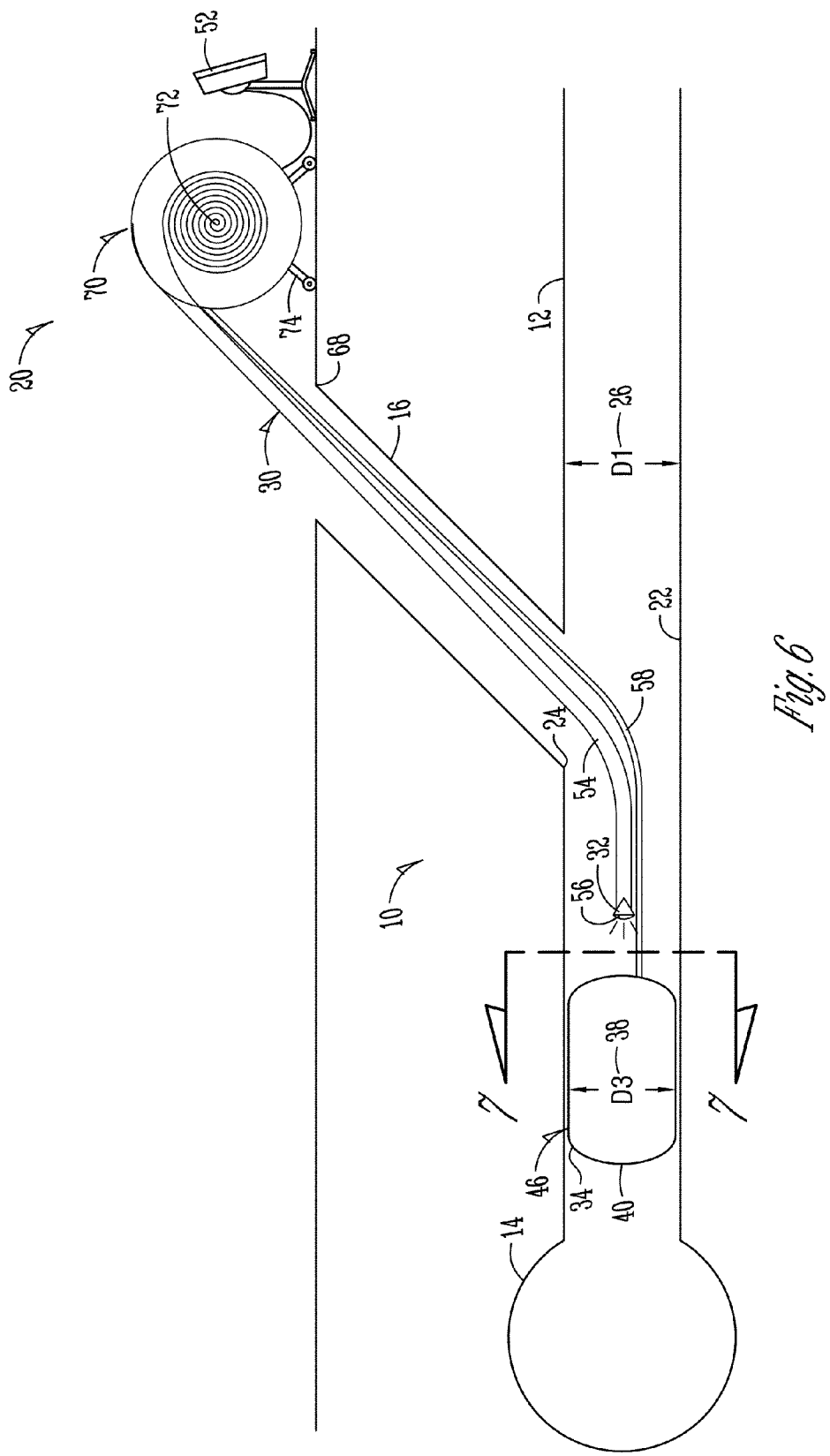
FIG. 6 is a sectional view of the assembly of FIG. 5 in the lateral pipe and being in a measuring position.

FIG. 6 is a sectional view of the assembly of FIG. 5 in lateral pipe 12 and being in the measuring configuration 46. The measuring assembly 30 is further inserted through the opening 24 of the lateral pipe 12 to determine the diameter 26 of the lateral pipe 12. Once the measuring assembly 30 has been fully inserted into a lateral pipe 12, air or another fluid is provided to the reference device 34 to inflate the reference device 34 to the predetermined diameter 38. As the predetermined diameter is known, the diameter 26 of the lateral pipe 12 may be determined by viewing imaging data 50 acquired from the imaging device 32 of the measuring assembly 30. The reference device 34 is an inflated plug 40 expanded to its fullest position in FIG. 6. As also seen in FIG. 6, the inflated plug 40 is forward of the imaging device 32 such that the imaging device 32 is able to view both the reference device 34 and the surrounding lateral pipe 12. In the instance that the imaging device 32 is a camera, a lens 56 connected to a photo cable 54 is positioned such that the lens 56 is able to acquire imaging data 50 of the inflated plug 40 relative to the wall 22 of the lateral pipe 12. It should also be noted that the reel 70 will continue to move the measuring assembly 30 through the lateral pipe 12 to continue to obtain imaging data 50 at various locations through the length of the lateral pipe 12 and also top determine if the diameter of the pipe changes, and if so, the location of the change in diameter of the pipe.

Figure 7:
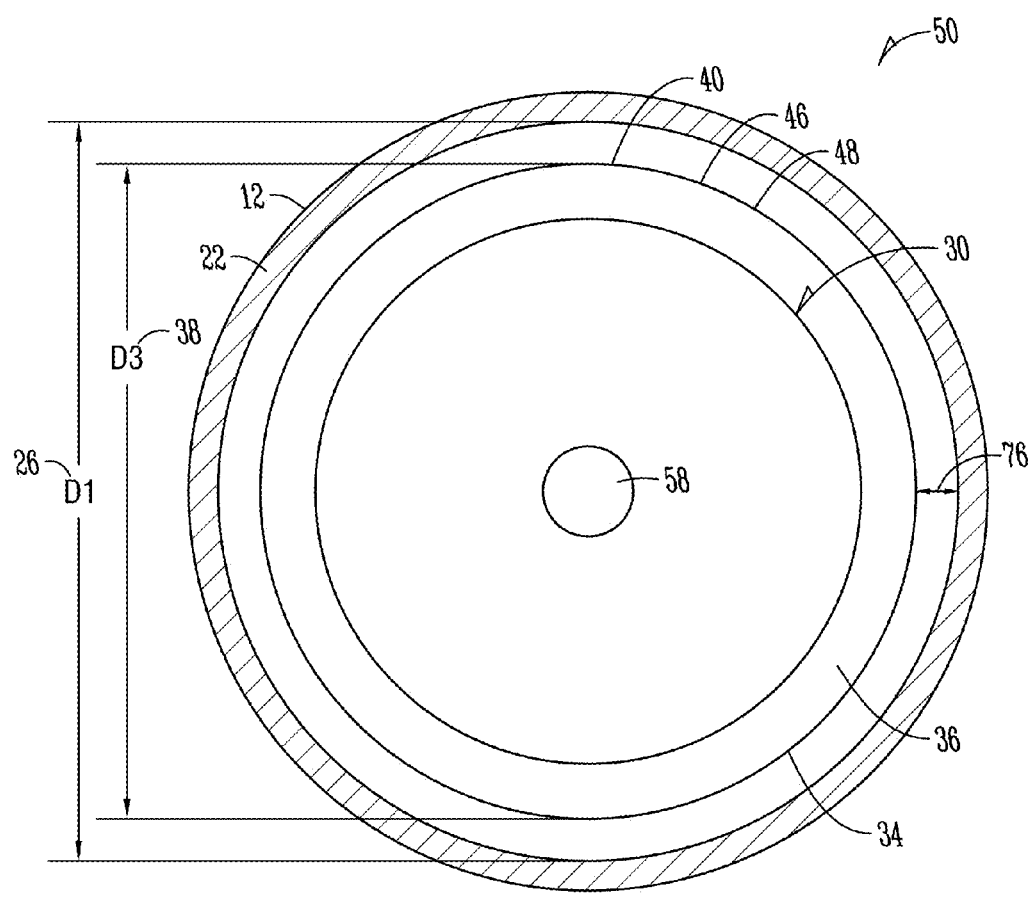
FIG. 7 is a cross-sectional view of the measuring assembly in the lateral pipe along the line 7-7 showing an example of the imaging data at a location in the pipe.

FIG. 7 is a cross-sectional view of the measuring assembly 30 in the lateral pipe 12 along line 7-7 of FIG. 6 showing an example of the imaging data 50 acquired at one location in the pipe. In the embodiment shown in FIG. 7, the imaging device is a camera and the acquired imaging data is a picture of video of inside the pipe. As shown in FIG. 7, the imaging data 50 includes an end of the inflated reference device 34 showing the outer wall 48 of the reference device 34 when the reference device 34 has been inflated to the predetermined diameter 38. The imaging data 50 also includes a view of the inside of the wall 22 of the lateral pipe 12. The wall 22 of the lateral pipe 12 has a diameter 26. The imaging data 50 is used to determine the diameter 26 of the lateral pipe 12. As the predetermined diameter 38 of the inflated reference device 34 is known, the predetermined diameter 38 can be used to determine a difference, if any, between the diameter of the lateral pipe 12 and the predetermined diameter. The example in FIG. 7 shows that the inflated reference device 34 has a predetermined diameter 38 which is less than the diameter 26 of the lateral pipe 12. This is shown by the gap 76 between the outer edge of the reference device and the inner portion of the wall of the lateral pipe. As most lateral pipes have general diameters of 4, 5, or 6 inches, having a predetermined diameter of one of these values allows an operator at a remote location 20 to determine the exact diameter of the lateral pipe 12. In FIG. 7, a gap 76 between the outer wall 48 of the inflated plug 40 and the wall 22 of the lateral pipe 12 is shown. Therefore, if the predetermined diameter 38 was 5 inches, it would be determined that the diameter of the lateral pipe 12 would be 6 inches. However, if the predetermined diameter 38 was the exact size of the lateral pipe 12 when the device is inflated, the diameters would match. On the other hand, if the reference device 34 was not able to inflate to its full predetermined diameter, it would be known that the diameter of the lateral pipe 12 is smaller than the predetermined diameter 38, which would also give you the exact diameter of the lateral pipe 12. As is the case, it is essential that the reinforcing scrim 36 holds the reference device 34 to the exact predetermined diameter 38 to get a correct diameter 26 for the lateral pipe 12.

Once the diameter 26 of the lateral pipe 12 has been determined, the reference device 34 is deflated and the measuring assembly 30 is retracted from the lateral and cleanout pipes 12, 16. The measuring device 30 may be retracted by rolling the reel 70, which pulls the assembly out of the pipes. The determined diameter 26 of the lateral pipe 12 is then used to choose a correct liner assembly for repairing the lateral pipe via cured-in-place pipe lining processes. The liner assembly generally includes a liner tube and a bladder tube that is inverted through the cleanout pipe 16 and into the lateral pipe 12 to repair a fractured wall of the lateral pipe 12. It is important to know the diameter of the lateral pipe 12 so as to choose a bladder and liner tube of the same size, so that the liner tube is able to cure against the wall 22 of the lateral pipe 12 without any tears or folds. Methods and apparatuses of repairing a lateral pipe with a bladder tube and liner tube are disclosed in U.S. Pat. Nos. 5,765,597; 6,695,013; and 7,343,937, which are hereby incorporated by reference in their entireties. Once the diameter of the lateral pipe is known, the method of repair described in the incorporated reference is able to repair the pipes properly.

The invention has been shown and described above with reference to preferred embodiments, and it is understood that modifications, substitutions, and additions may be made which are within the intended spirit and scope of the invention. The invention is only to be limited by claims appended hereto.

What is claimed is:

1. A method of determining the diameter of a pipe from a remote location to assist in repairing a wall of the pipe, comprising:
providing a measuring assembly comprising an imaging device and a reference device operatively connected to the imaging device and positioned at least partially forward of the imaging device;
inserting the measuring assembly into the pipe;
moving the measuring assembly through the pipe;
acquiring imaging data of the reference device and the pipe with the imaging device as the measuring assembly moves through the pipe;
wherein the reference device is a mechanical device having a known diameter; and
comparing the known diameter of the reference device to an interior of the pipe using the imaging data to determine the diameter of the pipe.

2. The method of claim 1 wherein the reference device is an inflatable plug.

3. The method of claim 2 wherein the inflatable plug includes a reinforcing scrim that prohibits expansion beyond a predetermined diameter.

4. The method of claim 3 wherein the inflatable plug is deflated prior to inserting the measuring assembly into the pipe.

5. The method of claim 4 further comprising inflating the plug to the predetermined diameter within the pipe.

6. The method of claim 5 wherein the imaging data is acquired of an outer wall of the inflatable plug and the surrounding pipe.

7. The method of claim 6 wherein the diameter of the pipe is determined by comparing the predetermined diameter of the inflated plug with the diameter of the pipe.

8. The method of claim 1 wherein the imaging device is a camera.

9. The method of claim 1 further comprising viewing the imaging data from a location remote of the inside of the pipe.

10. The method of claim 1 further comprising inserting the measuring assembly through a cleanout pipe to an opening in the pipe.

11. The method of claim 1 further comprising choosing a liner assembly comprising a liner tube impregnated with a resinous material capable of curing and hardening operatively connected to a bladder tube based on the diameter of the pipe.

12. The method of claim 11 further comprising removing the measuring assembly from the pipe.

13. The method of claim 12 further comprising positioning the liner assembly into the pipe.

14. The method of claim 13 further comprising inflating the liner assembly to fully press the liner tube against the wall of the lateral pipe.

15. The method of claim 14 further comprising allowing the resinous material to cure and harden.

16. The method of claim 15 wherein the pipe is a lateral pipe within a sewer system.

17. A measuring assembly for determining the diameter of a pipe from a remote location to assist in the repair of the pipe, comprising:
an imaging device for acquiring imaging data inside the pipe;
a reference device operatively connected to the imaging device and positioned at least partially forward of the imaging device;
wherein the reference device comprises a mechanical device having a known diameter; and
comparing the known diameter of the reference device to an interior of the pipe using the imaging data to determine the diameter of the pipe.

18. The assembly of claim 17 wherein the reference device is an inflatable plug.

19. The assembly of claim 18 wherein the inflatable plug further comprises a reinforcing scrim to limit the inflated diameter of the plug to the predetermined diameter.

20. The assembly of claim 18 wherein the plug includes a deflated state where the diameter of the plug is smaller than the predetermined diameter.

21. The assembly of claim 20 further comprising an air hose for inflating and deflating the inflatable plug.

22. The assembly of claim 21 wherein the plug is inflated inside the pipe to determine the diameter of the pipe.

23. The assembly of claim 17 further comprising an imaging viewer for viewing the acquired imaging data from the imaging device.

24. The assembly of claim 17 wherein the imaging device is a camera.

25. The assembly of claim 24 further comprising an imaging cable operatively connected to the camera for transporting imaging data to an imaging screen at a remote location.

26. The assembly of claim 17 wherein the imaging data is a picture of an outer wall of the reference device compared to the pipe.

27. A method of determining the diameter of a lateral pipe of a sewer pipe system from a remote location outside of the sewer to assist in repairing a wall of the pipe, comprising:
providing a measuring assembly including an imaging device, an imaging cable operatively connected to the imaging device, an inflatable plug operatively connected to the imaging device and positioned at least partially forward of the imaging device, and an air hose;
inserting the measuring assembly into the lateral pipe;
inflating the plug to a predetermined diameter within the lateral pipe;
moving the measuring assembly through the lateral pipe;
acquiring imaging data from the imaging device including the predetermined diameter of the inflatable plug relative to the diameter of the lateral pipe as the measuring assembly moves through the length of the lateral pipe; and
comparing the predetermined diameter of the inflatable plug to the diameter of the lateral pipe using the imaging data to determine the diameter of the lateral pipe.

28. The method of claim 27 wherein the imaging device is a camera.

29. The method of claim 28 further comprising viewing the imaging data at a remote location.

30. The method of claim 29 wherein the diameter of the lateral pipe is determined by comparing the predetermined diameter of the fully inflated plug to the diameter of the lateral pipe.

31. The method of claim 27 further comprising inserting the measuring assembly through a cleanout pipe and into the lateral pipe.

32. The method of claim 31 wherein the plug is deflated until it is inserted into the lateral pipe.

33. The method of claim 27 wherein the air hose is operatively connected to the plug and is used to inflate and deflate the plug in the lateral pipe.

34. The method of claim 27 wherein moving the measuring device through the lateral pipe length comprises pushing the assembly through the pipe.

35. The method of claim 27 wherein the imaging cable transmits the imaging data from the lateral pipe to the remote location.

36. A measuring assembly for determining the diameter of a lateral pipe of a sewer pipe system from a remote location outside of the sewer to aid in repairing the lateral pipe, comprising:
- an imaging device for collecting imaging data in a lateral pipe;
- an imaging cable operatively connected to the imaging device and configured to transmit the imaging data to the remote location;
- an inflatable plug operatively connected to the imaging device and positioned at least partially forward of the imaging device, the plug having a predetermined diameter when fully inflated;
- an air hose operatively connected to the plug and configured to inflate the plug after the assembly is inserted into the lateral pipe;
- comparing the predetermined diameter of the inflatable plug to a diameter of the lateral pipe using the imaging data to determine the diameter of the lateral pipe.

37. The assembly of claim 36 wherein the imaging device is a camera.

38. The assembly of claim 37 wherein the imaging data is a picture.

39. The assembly of claim 38 wherein the picture is a view of an outer wall of the plug and of a wall of the lateral pipe.

40. The assembly of claim 37 wherein the imaging data is a video.

41. The assembly of claim 36 wherein the plug further comprises a reinforcing scrim to limit the inflatability of the plug to the predetermined diameter.

42. The assembly of claim 36 wherein the plug includes a deflated state where the diameter of the plug is smaller than the predetermined diameter.

43. The assembly of claim 36 further comprising an imaging viewer operatively connected to the imaging device.

44. The assembly of claim 43 wherein the imaging viewer displays the imaging data acquired by the imaging device.

45. The assembly of claim 44 wherein the imaging viewer is a screen.

46. A method of repairing at least a portion of a lateral pipe of a sewer system, comprising:
- determining the diameter of the lateral pipe along the length of the pipe by providing a measuring device comprising an imaging device and a reference plug having a predetermined diameter and being at least partially forward the imaging device, acquiring imaging data of a difference between the diameter of the plug and the diameter of the lateral pipe, and comparing the imaging data to the predetermined diameter of the reference plug and the lateral pipe to determine the diameter of the lateral pipe;
- choosing a liner assembly, comprising a bladder tube and a liner tube impregnated with a resinous material capable of curing and hardening, based on the diameter of the lateral pipe;
- inserting the liner assembly into the lateral pipe;
- pressing the liner tube against a wall of the lateral pipe;
- allowing the resinous material to cure and harden; and
- removing the bladder tube from the lateral pipe to leave the liner tube cured in place in the lateral tube along a length of the lateral pipe.

47. The method of claim 46 wherein the liner assembly is inverted into the lateral pipe.

48. The method of claim 47 further comprising inflating the bladder tube within the lateral pipe.

49. The method of claim 48 wherein the diameter of the inflated bladder tube is equal to the diameter of the lateral pipe.

50. The method of claim 46 wherein the step of determining the diameter of the lateral pipe further comprises inserting the measuring assembly into the lateral pipe.

* * * * *